May 5, 1970 R. H. DUNHAM 3,510,141
WORKPIECE STOP FOR COLLET CHUCKS
Filed Oct. 9, 1968

INVENTOR
RUSSELL H. DUNHAM

BY Mandeville & Schweitzer

ATTORNEYS

United States Patent Office 3,510,141
Patented May 5, 1970

3,510,141
WORKPIECE STOP FOR COLLET CHUCKS
Russell H. Dunham, New Fairfield, Conn., assignor to
The Dunham Tool Company, Inc., New Fairfield,
Conn., a corporation of Connecticut
Filed Oct. 9, 1968, Ser. No. 766,256
Int. Cl. B23b 31/20, 13/12, 25/00
U.S. Cl. 279—51                                        10 Claims

ABSTRACT OF THE DISCLOSURE

A workpiece stop assembly for contracting collet-actuating sleeve combinations, which stop assembly includes a ring externally mounted to the exposed face of the sleeve and has a stop body disposed within the bore of the collet. The stop body is cantilevered from the mounting ring by thin L-shaped fins which extend from the mounting ring to the stop body through the slots of the collet.

BACKGROUND OF THE INVENTION

Heretofore, workpiece stops of a wide variety of configurations have been mounted directly within contracting collet chucks for movement therewith. However, when the workpieces which are inserted into the collets into engagement with such stops are not uniform in outer diameter, the workpieces will be non-uniformly drawn along with the collet and stop into the actuating sleeve in the turning machine. That is to say, smaller diameter workpieces will be drawn further into the machine during collet actuation than larger diameter workpieces. Thus, when the diameters of workpieces vary, the extent of their projection from the collet will be non-uniform since the workpiece stop travels with the collet. Therefore, where great accuracy in length is required, the position of the workpiece stop should be fixed and should be independent of the collet travel which is influenced by workpiece diameter.

The disadvantages of mounting workpiece stops directly the collet itself have been recognized, and alternatives have been proposed. For example, limitation of axial displacement of the workpiece stop has been achieved by mounting it internally of the actuating sleeve for cooperation with internal portions of the actuating sleeve. However, these proposals have often required the use of special sleeves and in all cases have made mounting and adjustment of the stops extremely difficult.

Therefore, the objectives of the present invention is the provision of a workpiece stop which overcomes the shortcomings and disadvantages of the collet stop constructions heretofore available.

SUMMARY OF THE INVENTION

In accordance with the principles of the present invention; a workpiece stop, which may be easily and quickly mounted externally of the actuating sleeve at the exposed front face thereof, is provided. The new and improved workpiece stop may be assembled inexpensively from a few simple parts. Moreover access to the new stop for quick adjustments may be had from the front of the turning machine without the necessity of removing the collet therefrom or otherwise disassembling the collet-sleeve assembly. Additionally, the workpiece stop of the invention may be readily employed with standard contracting collet-sleeve combinations without modification thereto.

Specifically, the workpiece stop of the invention comprises a stop body which is supported within the central bore of collet, as of course is the case with all such stops. However, the manner of supporting the stop body, and more specifically the manner of mounting the supporting members for the stop body is unique.

In accordance with the principles of the invention, the stop body is cantilevered from a mounting ring which may be instantly fastened to the face of the turning machine or sleeve by magnets. The cantilevering support elements are in the nature of thin fins which are suitably shaped to extend through the slots in the collet without interfering in any manner whatever with the operation of the collet jaws.

DESCRIPTION OF DRAWINGS

For a more complete understanding of the invention and a better appreciation of its attendant advantages, reference should be made to the following detailed description taken in conjunction with the accompanying drawings, in which.

PREFERRED EMBODIMENT OF INVENTION

Figure 2:
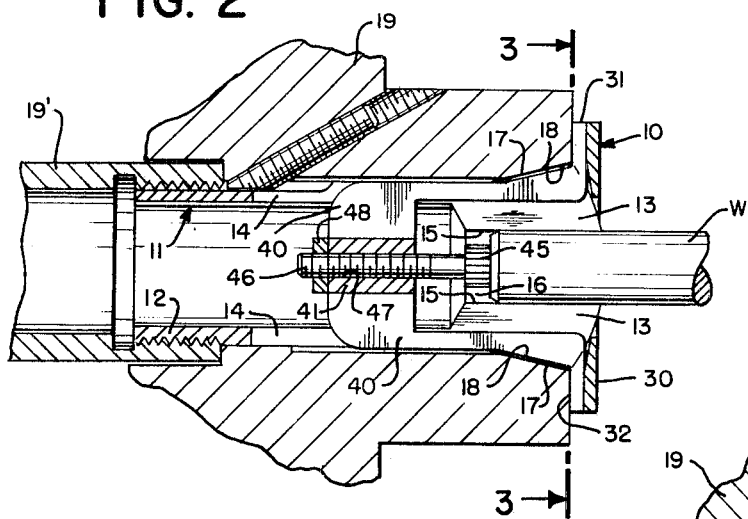
FIG. 2 is a cross-sectional view of the new workpiece stop and collet taken through the slots of the collet.

Referring now to FIG. 2, the new workpiece stop of the invention, generally designated by the reference numeral 10, is adapted for use with a contracting collet 11 of the type commonly employed on turning machines, e.g., a lathe having a rotatable spindle or actuating sleeve 19 and a draw tube 19'.

The illustrated collet 11 is a generally cylindrical member having threaded rearward portions 12, for fastening to the draw tube 19', and multiple contractible resilient jaws 13 separated by axially extending slots 14. The jaws 13 have inner cylindrical surfaces 15, which define a workpiece gripping bore 16, and outer tapered or conical surfaces 17 which engage correspondingly tapered or conical surfaces 18 of the spindle or actuating sleeve 19 which is in an axially fixed relation with the turning machine. Accordingly, when the collet is drawn into the machine by the displacement of the draw tube 19' in the direction indicated in FIG. 2, the jaws will be cammed inwardly to grip a workpiece. When the direction of the draw tube is reversed, the resilience of the jaws 13 will cause them to expand and to release the workpiece. As will be understood, the collet, while gripping the workpiece is rotated by the turning machine.

In accordance with the invention the new and improved workpiece stop assembly 10, includes an annular mounting element 30 which has a rearwardly extending annular flange 31 having a flat mounting surface 32. A series of permanently magnetized segments 33 are cemented into the flange 31 with the faces of the segments exposed in flush relation with and forming an integral part of the mounting surface 32. Needless to say, when desired or found necessary, the entire ring 30 may be fabricated from suitable magnetic material.

Figure 1:
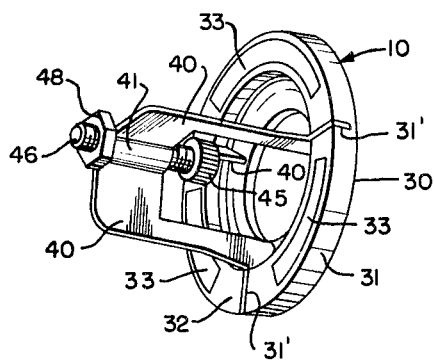
FIG. 1 is a perspective view of a workpiece stop embodying the inventive principles.

As an important aspect of the invention, three L-shaped supporting fins 40 are anchored in and project rearwardly from the mounting ring 30. The fins 40 support in cantilever fashion a cylindrical stop body 41 having a diameter smaller than that of the collect bore 16. As will be understood, the fins 40 are radially spaced identically (120° apart) to the spacing of the slots 14 of the collet with which the stop assembly 10 is to be employed. In accordance with the invention, the gauge of material from which the fins is fabricated is such that the fins may be easily disposed and translated within the collet slots. More specifically and as shown in FIG. 1 the forward ends 42 of the fins 40 are anchored by suitable techniques (welding, brazing, cementing, etc.) in slits 31' and are likewise suitably connected to the stop body 41 as shown.

In the preferred embodiment of the invention, the actual workpiece stop surface is the head 45 of a screw 46 which is threaded into a tapped bore 47 formed in the stop body. A lock nut 48 is provided to lock the screw 46 in any selected position. Of course, where adjustment is not required, the screw 46 may be omitted and the workpiece can be banked or stopped directly against the stop body 41 itself.

Figure 5:
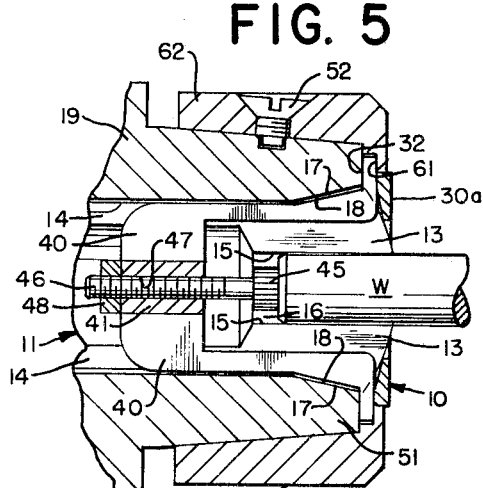
FIGS. 4 and 5 are cross-sectional views showing clamping caps for the new stop.
Figure 4:
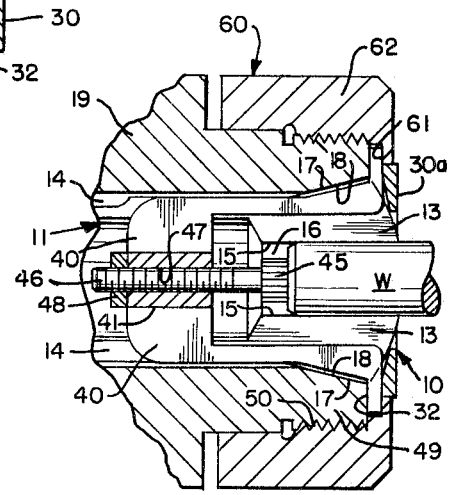
Figure 3:
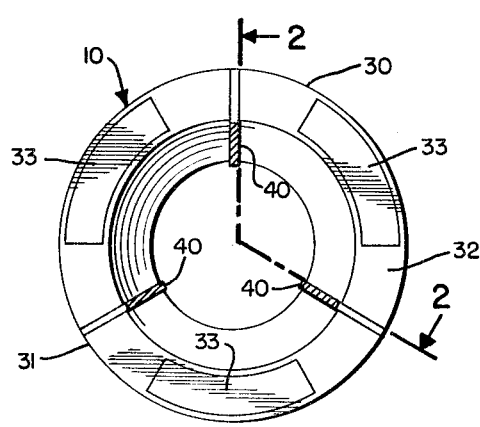
FIG. 3 is an elevational view of the new workpiece stop taken along line 3—3 of FIG. 2.

As will be appreciated, the new workpiece stop construction may be easily and economically manufactured. In use, it may be simply adjusted and readily installed or removed from operative collects in a matter of seconds by aligning the fins 40 with the collet magnetic slots 14 and pressing the mounting ring 30 against the face of the spindle 19. As should be apparent, fasteners other than magnets, e.g., double faced adhesive tape, screws, etc., may be employed when desired or necessary to secure the mounting ring to the face of the spindle 19. Alternatively, cylindrical clamping caps 60 having an annular stepped inner surface 61 may be used to engage the mounting ring 30, the external face 30a of which may advantageously be matingly stepped, and hold it securely against the face of the sleeve 19, as shown in FIGS. 4 and 5. The walls 62 of the caps 60 may be appropriately secured to threaded type spindles 49 by threads 50, as shown in FIG. 4, or to taper lock type spindles 51 by lock screws 52. It should be appreciated that the configuration of the external mount may be varied to meet the requirements of particular machinery applications.

It is to be understood, that other minor variations in the fundamental details and arrangements of the elements of the new workpiece stop assembly will readily suggest themselves to those skilled in the art, and that the embodiments which have been described and shown herein have been by way of example and explanation only. Accordingly, the full scope of the invention is set out in the following appended claims.

I claim:

1. A workpiece stop for a contracting collet-actuating sleeve combination in which the contracting collet has a forward body portion including a plurality of resilient jaws separated by axially extending slots and the inner surfaces of said jaws are definitive of a workpiece engaging bore of a predetermined diameter, said stop comprising
   (a) a stop body means having a cross-sectional configuration smaller than that of the bore of said collet;
   (b) cantilever support fins having rearwardly disposed distal portions supporting said stop body means;
   (c) mounting means anchoring the forwardmost ends of said fins;
   (d) the width of said fins being less than the width of the slots in said collet;
   (e) said fins being equal in number and angular displacement to the slots of said collet, whereby said fins may freely extend through said slots;
   (f) whereby the fixation of said mounting means relative to said sleeve with said fins within said slots will maintain said stop body means in a fixed position relative to said sleeve regardless of the axial displacement of said collet relative to said sleeve.

2. A collet stop in accordance with claim 1, in which
   (a) said stop body is cylindrical.
3. A collet stop in accordance with claim 1, in which
   (a) an adjustable screw means is carried by said stop body.
4. A collet stop in accordance with claim 3, in which
   (a) a locking means is associated with said screw means and stop body to lock said screw means in selectively adjusted positions.
5. A collet stop in accordance with claim 1, in which
   (a) said mounting means is annular in configuration.
6. A collet stop in accordance with claim 1, in which
   (a) said mounting means includes magnetized holding portions.
7. A collet stop in accordance with claim 6 in which
   (a) said magnetized holding portions comprise embedded segments of permanently magnetized material.
8. A collet stop in accordance with claim 1, which further includes
   (a) clamping cap means having an annular surface adapted to engage said mounting means and clamp the same against said actuating sleeve.
9. A collet stop in accordance with claim 1 in which
   (a) said fins are generally L-shaped having first leg portions extending axially rearwardly from said mounting means and second leg portions extending radially inwardly from said first portions to said stop body means.
10. A workpiece stop for a contracting collet-actuating sleeve combination in which the contracting collet has a forward body portion including a plurality of resilient jaws separated by axially extending slots and the inner surfaces of said jaws are definitive of a workpiece engaging bore of a predetermined diameter, said stop comprising
    (a) a stop body means having a cross-sectional configuration smaller than that of the bore of said collet;
    (b) cantilever support fins having rearwardly disposed distal portions supporting said stop body means;
    (c) mounting means adjoining the forwardmost ends of said fins and having mounting surfaces generally perpendicular to the planes of said fins;
    (d) the width of said fins being less than the width of the slots in said collet;
    (e) said fins being not greater in number and angular displacement to the slots of said collet, whereby said fins may freely extend through at least some of said slots;
    (f) whereby the fixation of said mounting means relative to said sleeve with said fins within said slots will maintain said stop body means in a fixed position relative to said sleeve regardless of the axial displacement of said collet relative to said sleeve.

References Cited

UNITED STATES PATENTS 2,842,371   7/1958   Kersten.
3,041,078   6/1962   Lawall _____ 279—51

ROBERT C. RIORDON, Primary Examiner

D. D. EVENSON, Assistant Examiner